United States Patent
Attias et al.

(10) Patent No.: US 9,430,427 B2
(45) Date of Patent: *Aug. 30, 2016

(54) STRUCTURED BLOCK TRANSFER MODULE, SYSTEM ARCHITECTURE, AND METHOD FOR TRANSFERRING

(71) Applicant: Synopsys, Inc., Mountain View, CA (US)

(72) Inventors: Roberto Attias, Alameda, CA (US); William Charles Jordan, Tres Pinos, CA (US); Bryon Irwin Moyer, Sunnyvale, CA (US); Stephen John Joseph Fricke, Felton, CA (US); Akash Renukadas Deshpande, San Jose, CA (US); Navendu Sinha, Milpitas, CA (US); Vineet Gupta, San Jose, CA (US); Shobhit Sonakiya, Fremont, CA (US)

(73) Assignee: Synopsys, Inc., Mountain View, CA (US)

(*) Notice: Subject to any disclaimer, the term of this patent is extended or adjusted under 35 U.S.C. 154(b) by 183 days.

This patent is subject to a terminal disclaimer.

(21) Appl. No.: 14/195,457

(22) Filed: Mar. 3, 2014

(65) Prior Publication Data

US 2014/0181343 A1 Jun. 26, 2014

Related U.S. Application Data

(63) Continuation of application No. 11/607,474, filed on Dec. 1, 2006, now Pat. No. 8,706,987.

(51) Int. Cl.
*G06F 13/362* (2006.01)
*G06F 13/28* (2006.01)
*G06F 3/06* (2006.01)

(52) U.S. Cl.
CPC .......... *G06F 13/362* (2013.01); *G06F 3/065* (2013.01); *G06F 3/067* (2013.01); *G06F 3/0619* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 4,642,789 | A | 2/1987 | Lavelle |
| 4,700,292 | A | 10/1987 | Campanini |
| 5,408,469 | A | 4/1995 | Opher et al. |
| 5,758,106 | A | 5/1998 | Fenwick et al. |
| 5,898,889 | A | 4/1999 | Davis et al. |
| 5,948,067 | A | 9/1999 | Caldara et al. |

(Continued)

OTHER PUBLICATIONS

Gong, S. et al., "Design of an Efficient Memory Subsystem for Network Processor," IEEE, copyright 2005, pp. 897-900.

(Continued)

*Primary Examiner* — Yaima Rigol
(74) *Attorney, Agent, or Firm* — Fenwick & West LLP

(57) ABSTRACT

Structured block transfer module, system architecture, and method for transferring content or data. Circuit allowing content in one memory to be shifted, moved, or copied to another memory with no direction from a host., the circuit comprising: a connection manager, at least one copy engine, and a connection between the connection manager and the copy engine. Method for transferring the contents of one of a number of blocks of source memory to one of a number of possible destination memories comprising: selecting source memory; selecting available destination memory; marking the selected destination as no longer available; copying contents of selected source memory into selected destination memory; and marking selected source as available.

18 Claims, 16 Drawing Sheets

(56) References Cited

U.S. PATENT DOCUMENTS

| | | |
|---|---|---|
| 5,996,032 A | 11/1999 | Baker |
| 6,009,096 A | 12/1999 | Jaisingh et al. |
| 6,058,438 A | 5/2000 | Diehl et al. |
| 6,088,740 A | 7/2000 | Ghaffari et al. |
| 6,163,539 A | 12/2000 | Alexander et al. |
| 6,172,540 B1 | 1/2001 | Gandhi |
| 6,182,177 B1 | 1/2001 | Harriman |
| 6,381,242 B1 | 4/2002 | Maher, III et al. |
| 6,408,369 B1 | 6/2002 | Garrett et al. |
| 6,415,296 B1 | 7/2002 | Challener et al. |
| 6,421,751 B1 | 7/2002 | Gulick |
| 6,453,360 B1 | 9/2002 | Muller et al. |
| 6,480,489 B1 | 11/2002 | Muller et al. |
| 6,513,102 B2 | 1/2003 | Garrett et al. |
| 6,606,301 B1 | 8/2003 | Muller et al. |
| 6,700,888 B1 | 3/2004 | Jonsson et al. |
| 6,804,679 B2 | 10/2004 | Jevons et al. |
| 6,847,984 B1* | 1/2005 | Midgley ............. G06F 11/1466 |
| 7,076,595 B1 | 7/2006 | Dao et al. |
| 7,133,984 B1 | 11/2006 | Dickensheets |
| 7,162,608 B2 | 1/2007 | Bethard |
| 7,228,422 B2 | 6/2007 | Morioka et al. |
| 7,246,197 B2 | 7/2007 | Rosenbluth et al. |
| 7,289,537 B1 | 10/2007 | Devanagondi et al. |
| 7,295,575 B2 | 11/2007 | Ido et al. |
| 7,307,986 B2 | 12/2007 | Henderson et al. |
| 7,320,041 B2 | 1/2008 | Biran et al. |
| 7,325,122 B2 | 1/2008 | Abdelilah et al. |
| 7,337,201 B1 | 2/2008 | Yellin et al. |
| 7,380,106 B1 | 5/2008 | Bilski |
| 7,386,704 B2 | 6/2008 | Schulz et al. |
| 7,389,315 B1 | 6/2008 | Scott |
| 7,389,403 B1 | 6/2008 | Alpert et al. |
| 7,487,302 B2 | 2/2009 | Gouldey et al. |
| 7,545,809 B2 | 6/2009 | Engbersen et al. |
| 7,602,801 B2 | 10/2009 | Hayashi et al. |
| 7,623,539 B2 | 11/2009 | Isley |
| 7,715,437 B2 | 5/2010 | Denney et al. |
| 7,742,480 B2 | 6/2010 | Calvignac et al. |
| 7,826,486 B2 | 11/2010 | Calvignac et al. |
| 7,835,398 B2 | 11/2010 | Denney et al. |
| 7,839,852 B2 | 11/2010 | Liu et al. |
| 7,924,882 B2 | 4/2011 | Nagai et al. |
| 2002/0019917 A1* | 2/2002 | Teshima ............. G06F 13/28 711/161 |
| 2002/0026502 A1 | 2/2002 | Phillips et al. |
| 2002/0085551 A1 | 7/2002 | Tzeng |
| 2002/0091826 A1 | 7/2002 | Comeau et al. |
| 2002/0105910 A1 | 8/2002 | Maher, III et al. |
| 2002/0136211 A1 | 9/2002 | Battle et al. |
| 2002/0145974 A1 | 10/2002 | Saidi et al. |
| 2002/0161941 A1 | 10/2002 | Chue et al. |
| 2002/0163914 A1 | 11/2002 | Dooley |
| 2002/0163922 A1 | 11/2002 | Dooley et al. |
| 2002/0174279 A1 | 11/2002 | Wynne et al. |
| 2002/0174316 A1 | 11/2002 | Dale et al. |
| 2003/0031172 A1 | 2/2003 | Grinfeld |
| 2003/0079104 A1 | 4/2003 | Bethard |
| 2003/0086300 A1 | 5/2003 | Noyes et al. |
| 2003/0105617 A1 | 6/2003 | Cadambi et al. |
| 2003/0145155 A1 | 7/2003 | Wolrich et al. |
| 2003/0152078 A1 | 8/2003 | Henderson et al. |
| 2003/0152084 A1 | 8/2003 | Lee et al. |
| 2003/0161327 A1 | 8/2003 | Vlodavsky et al. |
| 2003/0172229 A1* | 9/2003 | Takasugi ............. G06F 3/0614 711/112 |
| 2003/0177252 A1 | 9/2003 | Krichevski et al. |
| 2003/0231634 A1 | 12/2003 | Henderson et al. |
| 2003/0233503 A1 | 12/2003 | Yang et al. |
| 2004/0004961 A1 | 1/2004 | Lakshmanamurthy et al. |
| 2004/0004964 A1 | 1/2004 | Lakshmanamurthy et al. |
| 2004/0037276 A1 | 2/2004 | Henderson et al. |
| 2004/0039891 A1 | 2/2004 | Leung et al. |
| 2004/0054837 A1 | 3/2004 | Biran et al. |
| 2004/0083308 A1 | 4/2004 | Sebastian et al. |
| 2004/0098701 A1 | 5/2004 | Klein |
| 2004/0193733 A1 | 9/2004 | Vangal et al. |
| 2004/0193768 A1 | 9/2004 | Carnevale et al. |
| 2004/0205110 A1 | 10/2004 | Hinshaw |
| 2004/0258043 A1 | 12/2004 | Engbersen et al. |
| 2005/0013318 A1 | 1/2005 | Fike et al. |
| 2005/0027958 A1 | 2/2005 | Fuente et al. |
| 2005/0038946 A1 | 2/2005 | Borden |
| 2005/0080928 A1 | 4/2005 | Beverly et al. |
| 2005/0165985 A1 | 7/2005 | Vangal et al. |
| 2005/0188129 A1 | 8/2005 | Abdelilah et al. |
| 2005/0259672 A1 | 11/2005 | Eduri |
| 2005/0278502 A1 | 12/2005 | Hundley |
| 2006/0007862 A1 | 1/2006 | Sayeedi et al. |
| 2006/0039374 A1 | 2/2006 | Belz et al. |
| 2006/0056435 A1 | 3/2006 | Biran et al. |
| 2006/0112272 A1 | 5/2006 | Morioka et al. |
| 2006/0129767 A1 | 6/2006 | Berenyi et al. |
| 2006/0146808 A1 | 7/2006 | Campini et al. |
| 2006/0149921 A1 | 7/2006 | Lim |
| 2006/0221976 A1 | 10/2006 | Isley |
| 2006/0251120 A1 | 11/2006 | Arimilli et al. |
| 2006/0294149 A1 | 12/2006 | Seshadri et al. |
| 2007/0088932 A1 | 4/2007 | Bethard |
| 2007/0248075 A1 | 10/2007 | Liu et al. |
| 2007/0271413 A1 | 11/2007 | Fujibayashi et al. |
| 2008/0010390 A1 | 1/2008 | Abdelilah et al. |
| 2008/0013541 A1 | 1/2008 | Calvignac et al. |
| 2008/0072005 A1 | 3/2008 | Abdelilah et al. |
| 2008/0155135 A1 | 6/2008 | Garg et al. |
| 2008/0253398 A1 | 10/2008 | Calvignac et al. |
| 2009/0067429 A1 | 3/2009 | Nagai et al. |
| 2009/0296738 A1 | 12/2009 | Shimada |
| 2012/0089548 A1 | 4/2012 | Kobayashi et al. |

OTHER PUBLICATIONS

Williams, B. et al., "Approaching ATM Switch Architectures," Network World, Nov. 16, 1992, 5 pages.

United States Office Action, U.S. Appl. No. 11/607,474, Aug. 15, 2013, 15 pages.

United States Office Action, U.S. Appl. No. 11/607,474, Jul. 7, 2010, 41 pages.

United States Office Action, U.S. Appl. No. 11/607,474, Feb. 3, 2010, 36 pages.

United States Office Action, U.S. Appl. No. 14/194,242, Nov. 2, 2015, 25 pages.

United States Office Action, U.S. Appl. No. 14/194,242, Mar. 16, 2016, 25 pages.

* cited by examiner

STRUCTURED BLOCK TRANSFER MODULE, SYSTEM ARCHITECTURE, AND METHOD FOR TRANSFERRING

RELATED APPLICATIONS

This application is a continuation of U.S. application Ser. No. 11/607,474 filed on Dec. 1, 2006 (now issued as U.S. Pat. No. 8,706,987), entitled "Structured Block Transfer Module, System Architecture and Method for Transferring," which are incorporated by reference herein in its entirety.

This application is related to U.S. application Ser. No. 11/607,481, filed on Dec. 1, 2006 (now abandoned); U.S. application Ser. No. 11/607,429 filed on Dec. 1, 2006 (issued as U.S. Pat. No. 8,289,966 on Oct. 16, 2012); U.S. application Ser. No. 11/607,452 filed on Dec. 1, 2006 (issued as U.S. Pat. No. 8,127,113 on Feb. 28, 2012); and U.S. application Ser. No. 13/358,407 filed on Jan. 25, 2012; and U.S. application Ser. No. 14/193,932 filed on Feb. 28, 2014; which are incorporated by reference herein in their entirety.

FIELD OF THE INVENTION

This invention pertains generally to systems, devices, and methods for processing data or other information in a multiple processor or multiple processor core environment using shared memory resources, and more particularly to systems, devices, and methods for processing data in such environments using a structured block transfer module, system architecture, and methodology.

BACKGROUND OF THE INVENTION

Increasingly, multiple-processor-based systems as well as processors having multiple cores are being deployed for computer, information processing, communications, and other systems where processor performance or throughput cannot be met satisfactorily with single processors or single cores. For convenience of description, these multiple-processor and multiple-core devices and systems will interchangeably be referred to as multi-core systems or architectures and the terms processors and cores will be used interchangeably.

When designing a multicore architecture, one of the most basic decisions that should be made by the designer is whether to use shared data storage or structure (such as is shown in the example in FIG. 1) or private data storage or structure (such as is shown in the example of FIG. 2).

In the exemplary shared memory architecture illustrated in FIG. 1, each of a plurality of processors 120 is coupled with a single storage or memory subsystem 110 through an arbiter 130 over some bus, communication link, or other connection means 140. The memory subsystem may be a single memory or some plurality of memories or memory modules that are organized to operate as single logical memory device 110.

In the exemplary architecture illustrated in FIG. 2, each of a plurality of processors 220 is separately coupled to its own private memory via connection 230. The processors are not illustrated as connected to the other processors nor are the memories illustrated as connected to other memories, because such connections are not inherently provided in these private memory architectures.

These data storage or structures may commonly be or include a memory, such as but not limited to a solid state memory. Conventionally, the benefit of shared memory is that multiple processors or cores can access it. By comparison, if a private data storage or memory is utilized, then only one processor can see and access it. It may be appreciated however, that even in a shared storage or memory design, although multiple processors or cores can see and ultimately access the shared memory, only one processor or core is allowed access at a time. Some form of memory arbitration must be put in place in order to arbitrate or resolve situations where more than processor or core needs to access shared memory. For processors or cores denied immediate memory access, they must wait their turn, which slows down processing and throughput.

Private memory may frequently work well for data that is only required by a single processor or core. This may provide some guarantee of access by the single processor or core with predictable latency. However, many multi-core architectures, particularly architectures of the type including parallel pipeline architectures process a collection of data called a "context". One example of a parallel pipeline architecture is illustrated in FIG. 3.

In this architecture, a plurality of blocks 310, each comprising a memory 320 plus a processor 330, arranged in parallel groups 340 and sequential sets 350. Context 360 flows though the blocks as indicated by the arrow 370, and is successively processed in each sequential set 350.

The context data is usually operated on in turn by various processors 330 in the pipeline. Typically, at any given time, only one processor needs access to or works on or processes the context data, so the context can be stored in private memory for fastest access. But when the processing of the context data by one processor is complete, the processor sends the context to another processor for continued processing. This means that when a private memory or storage architecture is used, the context data must be moved from the private memory of one processor into the private memory of the next processor. This is a specific example of a system problem where copying is required; other system situations may also require such copying, and the scope of the problem being addressed is not intended to be limited to this specific scenario.

There are a number of ways to copy the context between private memories in the architecture in FIG. 3 or other architectures. One of the most straightforward ways is for the processor to execute the copy as shown in FIG. 4.

In the example approach diagrammed in FIG. 4, a contents of memory 400 is copied using the resources of processor 430 which has access to its own private memory 400 and which is granted or in some way acquires access to the private memory 405 of a second processor 435. This copy path 425 proceeds from memory 400 to memory 405 via the normal communication path between first memory 400 and first processor 430 and between first processor 430 and second memory 405 using a special communication path 415. It may be noted that second processor 435 may not directly participate in the copy operation, but may operate to provide a permission or to enable access to second memory 405 by first processor 430. But even this approach requires that the processor spend time away from fundamental program execution with which it is tasked at the time in order to do the private memory to private memory copying operation. This loss of program execution time or machine cycles will usually severely penalize the performance of the system especially when there are sufficient processing tasks at hand and no excess processor capacity or throughput are available. For this copying approach to work, that second memory must be shared between the two processors so that it is visible to the copying processor. This means that the second memory is not really private to the second processor during the copying operation.

If some attempt is made to assure that a second memory associated with a second processor really is private, then the data must be placed in some shared holding area or intermediate memory and copied by both processors, that is from the first processor from its first private memory to the share holding area or intermediate memory and then from the intermediate memory by the second processor to its own private memory, as shown in FIG. 5. In this example, first processor 540 copies data from its private memory 500 to a holding or intermediate memory 510 and then second processor 590 copies those data from the holding or intermediate memory 510 to its own private memory 520. The data copy and transfer path 560 is illustrated, as are the first communication path or link 550 between first processor 540 and holding memory 510, and the second communication path or link 570 between second processor 590 and holding memory 510. This approach doubles the time or lost processor penalty of having the first and second processors that might otherwise be available to real processing operations, do the copy.

An alternative approach that relieves some of this copy operation time is to employ a dedicated Direct Memory Access (DMA) engine to do the actual copying as illustrated in the example of FIG. 6. In this approach, first processor 670 is coupled to first private memory 600 over a bus or other communications link 630, and second processor 690 is coupled to its private memory 620 over a second bus or communications link 680; however, these paths are not used for the copy operation. Instead, a Direct Memory Access (DMA) unit, circuit or logic 610 is interposed between the first memory 600 and the second memory 620 and controls the direct transfer of the data between the two memories. First processor 670 acts as the host via connection 640 and provides control over the DMA (and at least its own private memory 600) to facilitate the copy or transfer. The transfer or copy path 650 is also shown and is a path from first memory 600 to second memory 620 through DMA 610.

Unfortunately, even this approach has some limitations and is not entirely satisfying. First, DMA 610 requires host control (in this case provided at least in part by first processor 670), so the processor still has, for example, to provide the memory source and destination addresses. Because there is no way for first processor 670 to access second memory 620, processor 670 can use a fixed destination address or processor 690 must communicate a destination address to processor 670 through some communication mechanism. The former solution removes a significant amount of flexibility for second processor 690 since it is not free to assign memory usage in the manner most advantageous to its functioning. The latter requires an explicit coordination between the two processors.

Second, the first processor 670, after having provided the DMA 610 with source and destination addresses and the size of the memory to copy, must wait for the copy operation to be complete in order to free up the occupied memory for new processing data. While less of a penalty than if the processor did the actual copying operation, the wait for completion is still substantial and may usually be unacceptable in high-performance embedded systems. Even if the processor can perform some background task while waiting for the completion, the required bookkeeping adds complexity to the processor program.

With reference to FIG. 7, a memory segmenting approach is taken. In this approach first processor 780 is coupled to its private memory 700 over a memory to processor bus or link 750, and second processor 790 is coupled to its private memory 710 over a memory to processor bus or link 770. Each of first memory 700 and second memory 710 are partitioned into first and second partitions. First processor 780 may continue to communicate and use a first partition 715, via data path 740 while a second partition 725 is accessible to DMA 720; a partition of second memory 710 is also accessible to DMA 720. DMA 720 may participate in a transfer or copy operation from the second partition of first memory 700, but there remains some ambiguity regarding copy path 730 as indicated by the question mark "?" in the diagram as to which partition the copied data should be written to.

In this way, it is possible to segment memory such that the processor may use one segment while processing its primary data stream using the other partition, while the DMA engine is copying to or from another memory segment, as FIG. 7 illustrates. This technique is also known as "double buffering". Unfortunately, neither the upstream processor (e.g. the first processor 780) nor the DMA engine 720 can know which memory segment or partition to copy to in the downstream memory (e.g. second memory 710) if the memories are private. In addition, if the upstream processor (e.g. first processor 780) has a choice of alternative downstream processors to use as the destination, the DMA engine 720 provides no assistance in determining which of those alternative processors would be the proper or best destination.

Yet another approach would be to put the code that handles copying into a different thread from the main application code. In systems and devices that have a multithreading capability, a multi-threaded processor could swap threads during the copy operation and process a different context. However, low-end processing subsystems that are often used in embedded systems do not have multi-threading capability.

Therefore it may be appreciated that none of these various approaches provides an entirely suitable solution for copying a specified block of private memory from one processor into a location in the private memory pertaining to a second processor, and that there remains a need for a system for executing such a copy.

SUMMARY OF THE INVENTION

In one aspect, the invention provides a structured block transfer module, a system architecture, and method for transferring content or data.

In another aspect, the invention provides a circuit that allows content in one memory to be shifted or moved to another memory with no direction from a host, the circuit comprising: a connection manager with a plurality of pointer inputs, a plurality of upstream free list pointer outputs, and a plurality of pointer outputs; at least one copy engine with data input busses and data output busses; and a connection between the connection manager and the at least one copy engine.

In another aspect, the invention further provides that this circuit may be adapted to perform one or any combinations of these operations: (a) identifying a particular source memory block as the source for a copy operation using any one or more of identified source memory identification criteria; (b) identifying a particular destination memory block as the destination for the copy operation using any one or more of a identified destination memory selection criteria; (c) maintaining a record of available memory blocks and occupied memory blocks for each potential destination processor; and (d) copying or moving the contents of the source memory to the selected destination memory.

In another aspect, the invention provides a connection manager with a plurality of pointer inputs, a plurality of upstream free list pointer outputs, and a plurality of pointer outputs.

In another aspect, the invention provides a copy engine with data input busses and data output busses.

In another aspect, the invention provides a connection means and mechanism for connecting a connection manager and a copy engine.

In another aspect, the invention provides a method for transferring the contents of one of a number of blocks of source memory to one of a number of possible destination memories, the method comprising: selecting a source memory; selecting an available destination memory; marking the selected destination as no longer available; copying the contents of the selected source memory into the selected destination memory; and marking the selected source as available.

DETAILED DESCRIPTION OF EXEMPLARY EMBODIMENTS OF THE INVENTION

Various aspects, features, and embodiments of the invention are now described relative to the figures.

Figure 1:
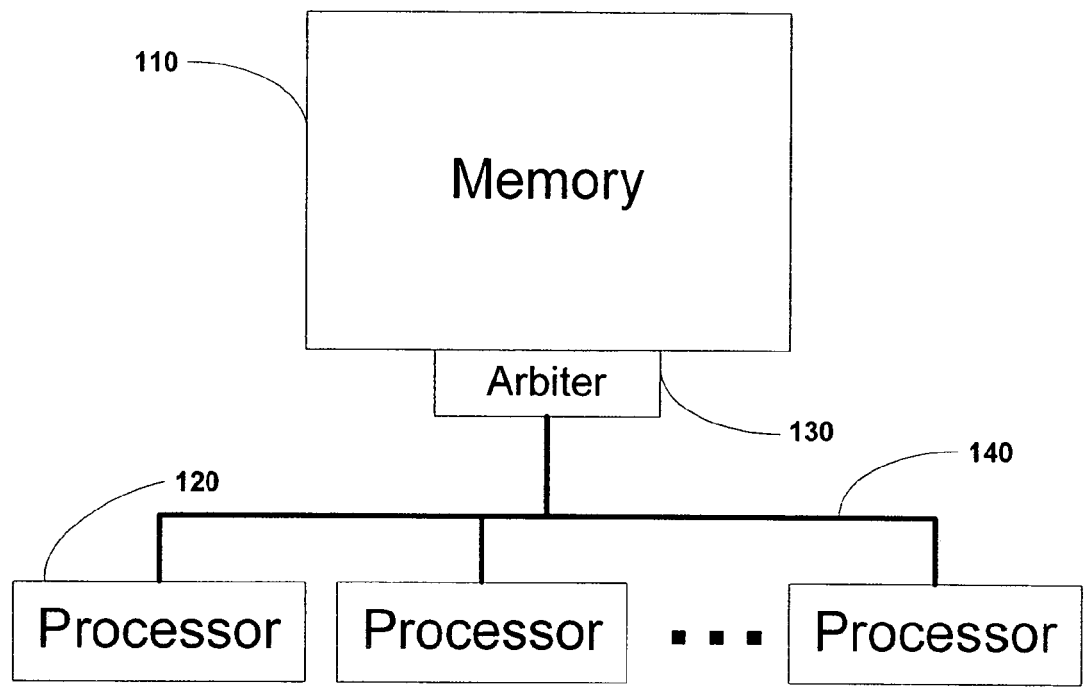
FIG. 1 shows a prior-art configuration with all processors using one common memory.
Figure 2:
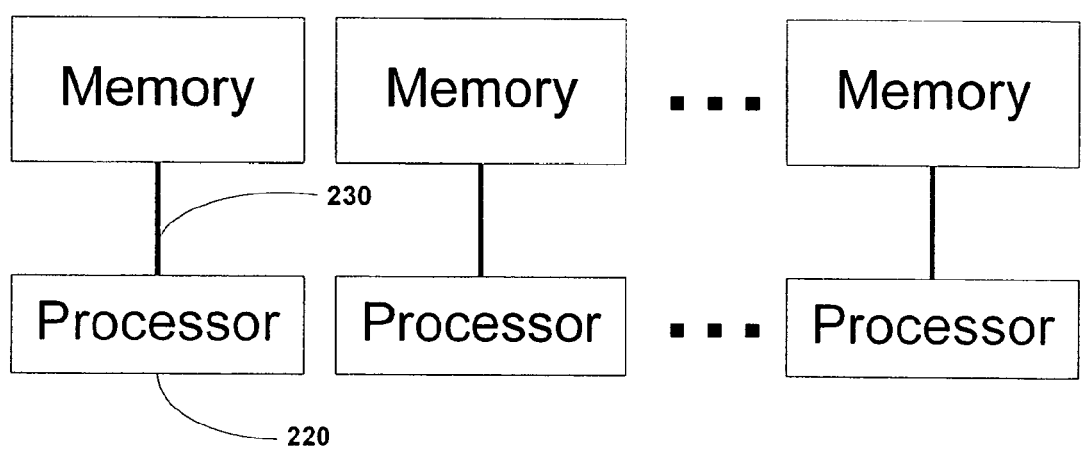
FIG. 2 shows a prior-art configuration with each processor having a private memory.
Figure 3:
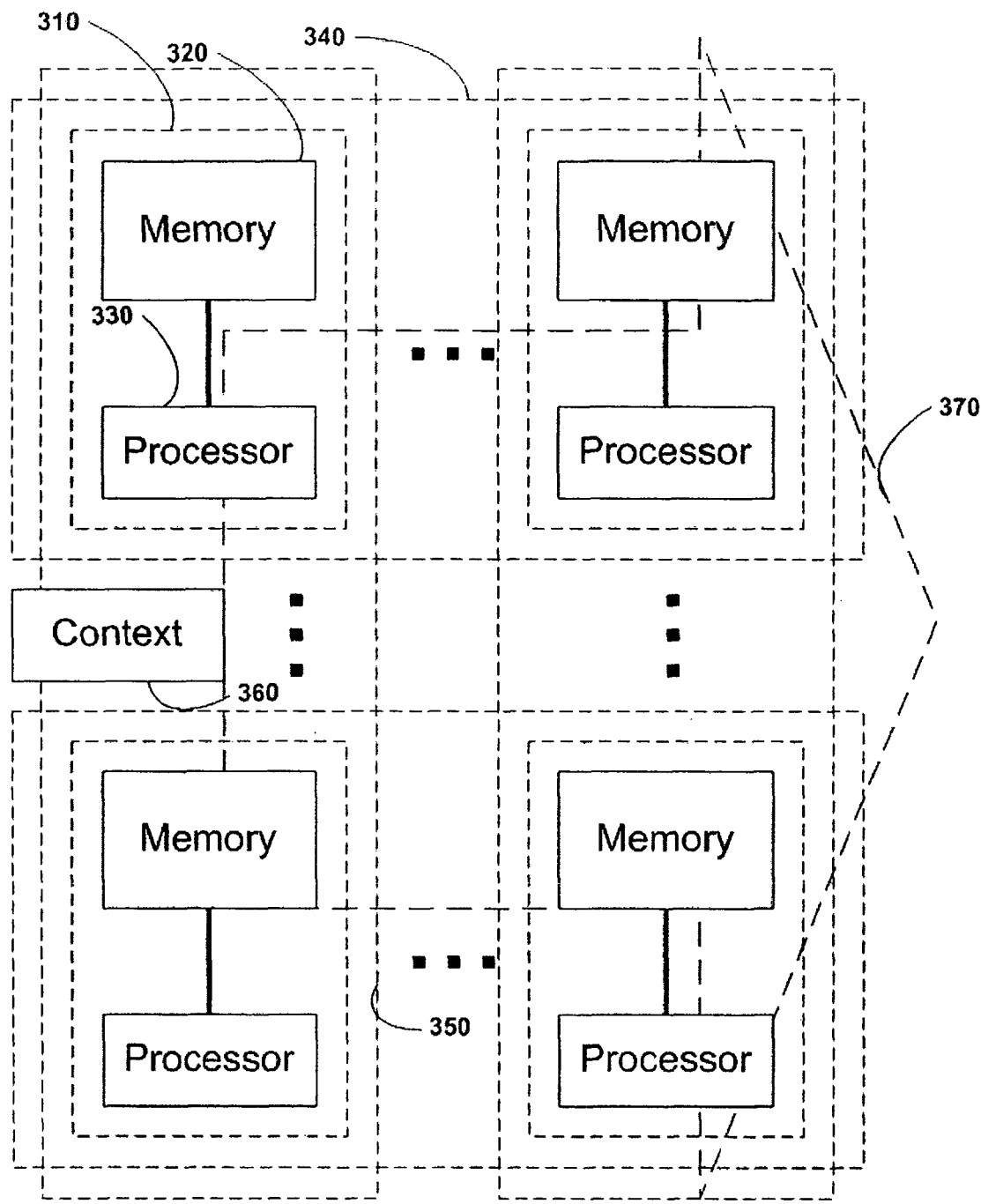
FIG. 3 shows a prior-art parallel pipeline structure with a context that moves through the pipeline as it is processed.
Figure 4:
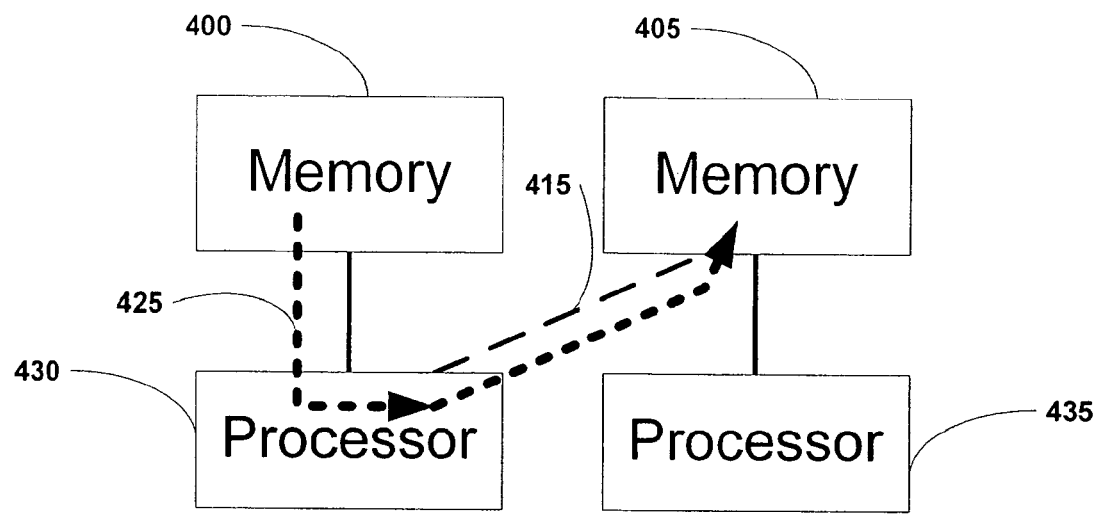
FIG. 4 shows a prior-art configuration where a processor copies the contents of its memory to the memory of the succeeding processor.
Figure 5:
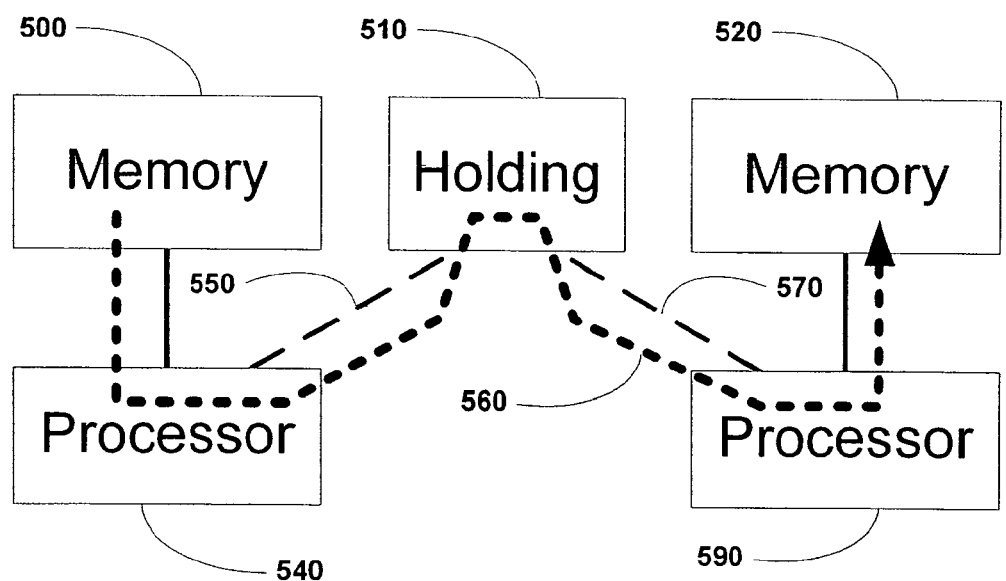
FIG. 5 shows a similar configuration to the configuration in FIG. 4, but with a shared "holding" memory between the two processors.
Figure 6:
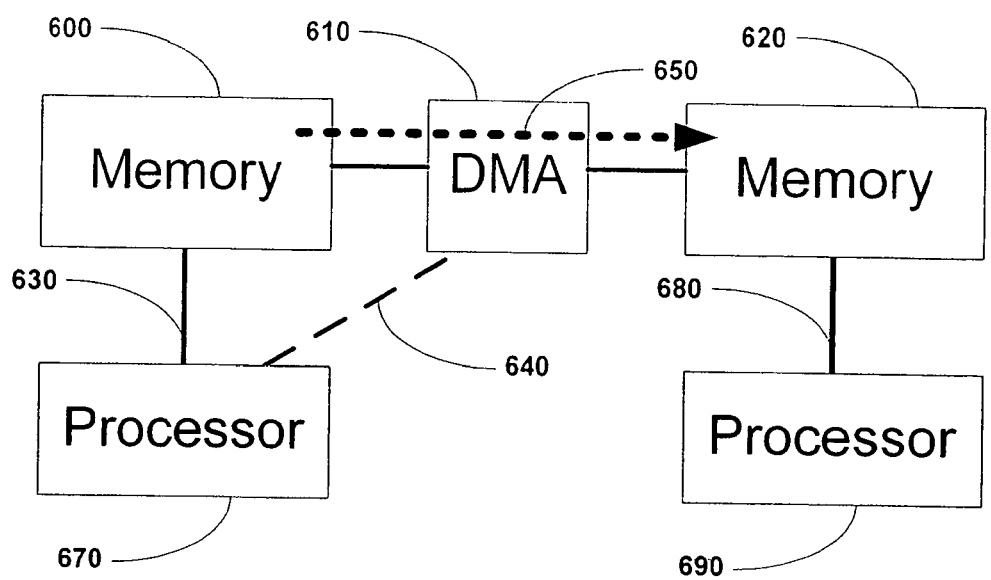
FIG. 6 shows a prior-art configuration where a DMA engine or processor copies the contents between the memories of two processors, under the direction of the sending processor.
Figure 7:
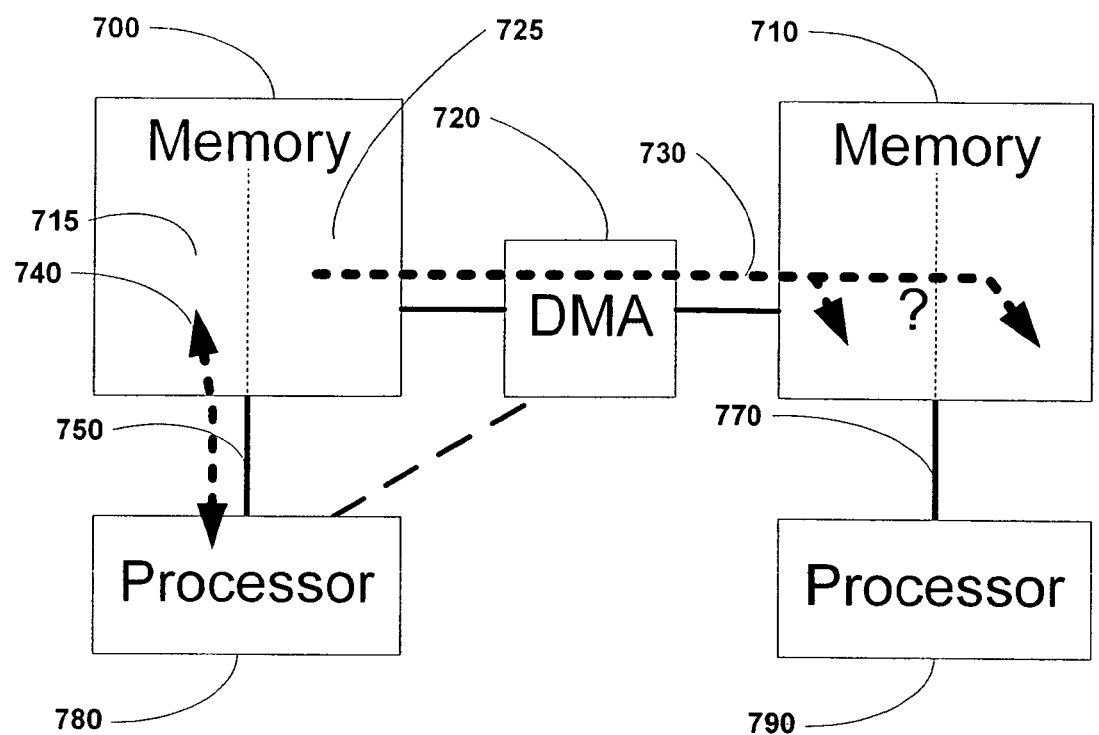
FIG. 7 shows what might be attempted using segmented memories with a DMA copying between them.
Figure 8:
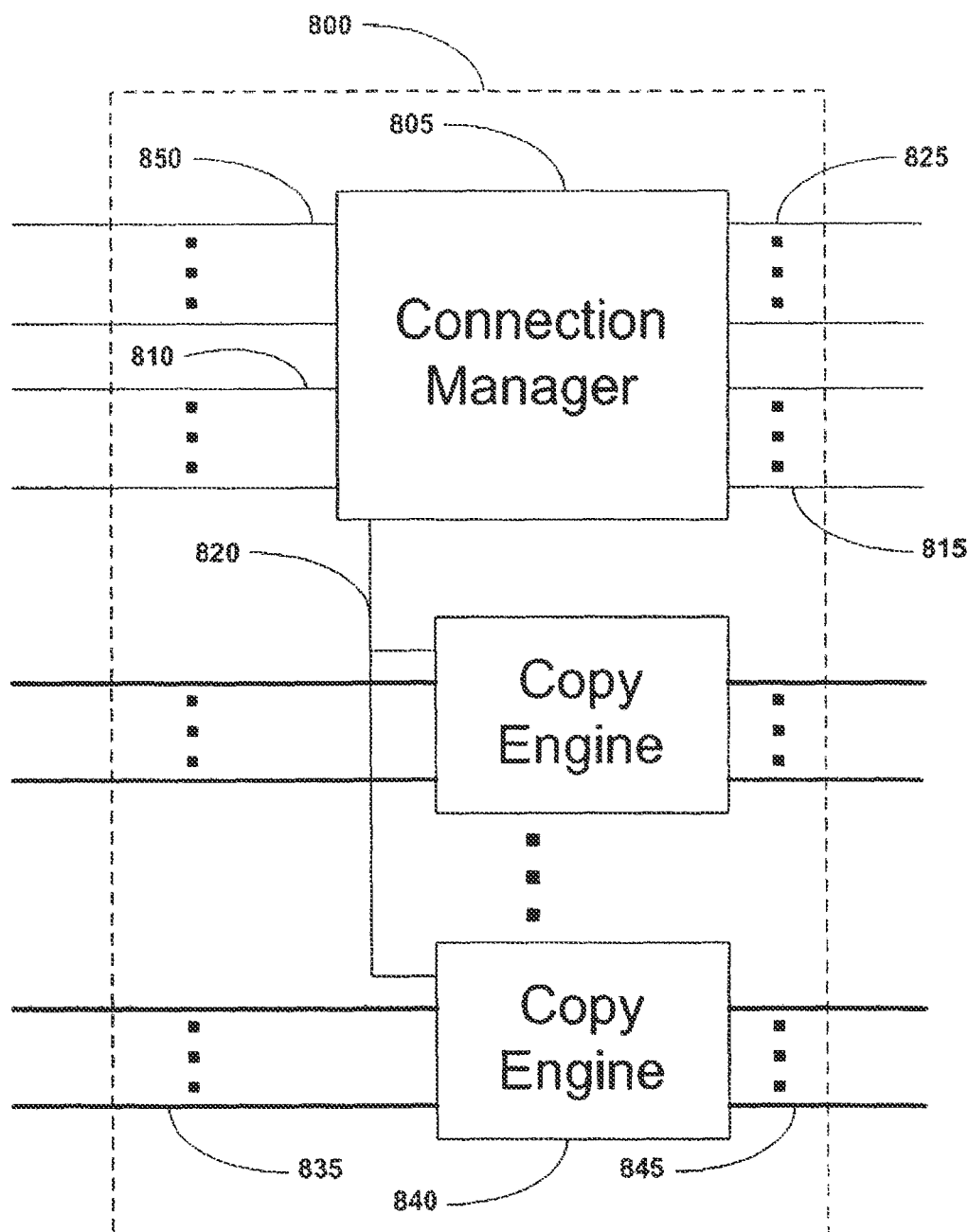
FIG. 8 shows an exemplary embodiment of an aspect of the invention.

In one aspect, the invention provides a structure for a Structured Block Transfer Module (SBTM) block or circuit, such as shown in the embodiment of FIG. 8. This embodiment of the SBTM as illustrated has been implemented using a Field Programmable Gate Array (FPGA), but the technology used for realizing the circuits described is not critical to the invention. Alternatively, it could have been implemented in an Application Specific Integrated Circuit (ASIC) or custom integrated circuit or combination of integrated circuits.

The exemplary SBTM 800 includes a connection manager 805 and one or more copy engines 840. The number of copy engines is not critical to the invention. Connection manager 805 receives copy requests on pointer inputs 810, selects copy requests based on a criterion or criteria that is/are not critical to the invention, selects a copy destination based on a criterion or criteria that is/are not critical to the invention, selects one of the copy engines 840 based on a criterion or criteria that is/are not critical to the invention, and instructs the selected copy engine 840 via copy enable signal 820 to copy the data from the selected source via copy input bus 835 to the selected destination via copy output bus 845. Free list inputs 825 provide a selection of available memory locations for copy destinations. Selection of a copy engine 840 only occurs if there is more than one copy engine 840 present. The format of copy enable signal 820 and the method of instruction are not critical to the invention. Copy enable signal 820 could be implemented using a collection of inputs, one for each copy engine 840, or by a common bus with an instruction identifying the targeted copy engine 840, or by any other suitable means. After copying is complete, connection manager 805 informs the selected destination of the location of the copied data via one of pointer outputs 815.

Connection manager 805 also places the pointer value on the selected pointer input 810 onto the upstream free list output 850 for the selected source. The number of pointer inputs 810, copy inputs 835, and upstream free list outputs 850 is determined by the number of potential sources of data to be copied. Each such source contributes a pointer input 810, a copy input 835, and an upstream free list output 850. The number of pointer outputs 815 copy outputs 845, and free list inputs 825 is determined by the number of potential copy destinations. Each destination contributes a pointer output 815, a copy output 845, and a free list input 825. The format (signal, bus, serial connection, etc.) of pointer inputs 810, pointer outputs 815, and upstream free list outputs 850, and free list inputs 825 may vary and is not critical to the invention. If the number of copy engines is different from the number of sources and/or destinations, then bussing, switching, or other well-understood methods can be used to connect the copy engines to the source and destination busses.

For the exemplary SBTM, given a number of potential source memory locations to be copied, the SBTM can provide any one or any combination of two or more of the following capabilities and features:

(1) Identify a suitable source memory as the source for a copy operation using any one or more of a number of criteria such as by way of example but not limitation, load balancing, and/or memory availability.

(2) Identify a suitable memory block as the destination using any one or more of a number of criteria such as by way of example but not limitation, specific direction, load balancing, and/or memory availability.

(3) Maintain a record of available and occupied memory blocks for each potential destination processor.

(4) Copy the contents of the selected source to the selected destination.

(5) Alter selected portions of the data during the copy process.

(6) Execute multiple block copies concurrently.

(7) Communicate back to the prior (upstream) SBTM (see FIG. 9) after the copy to inform the prior (upstream) SBTM in the pipeline that the source memory block is no longer being used.

(8) Receive communication from the subsequent (downstream) SBTM that it has emptied a memory block and mark that block as now being available for re-use.

As used herein, the term copy may mean copying or duplicating a content from one memory or storage location to another, or it may be moving or shifting the contents from one storage or memory location to another location without retaining the contents at the original storage or memory location, or it may mean realizing a content or data at a second storage or memory location without caring if the content or data was retained or deleted from the first storage or memory location.

Figure 9:
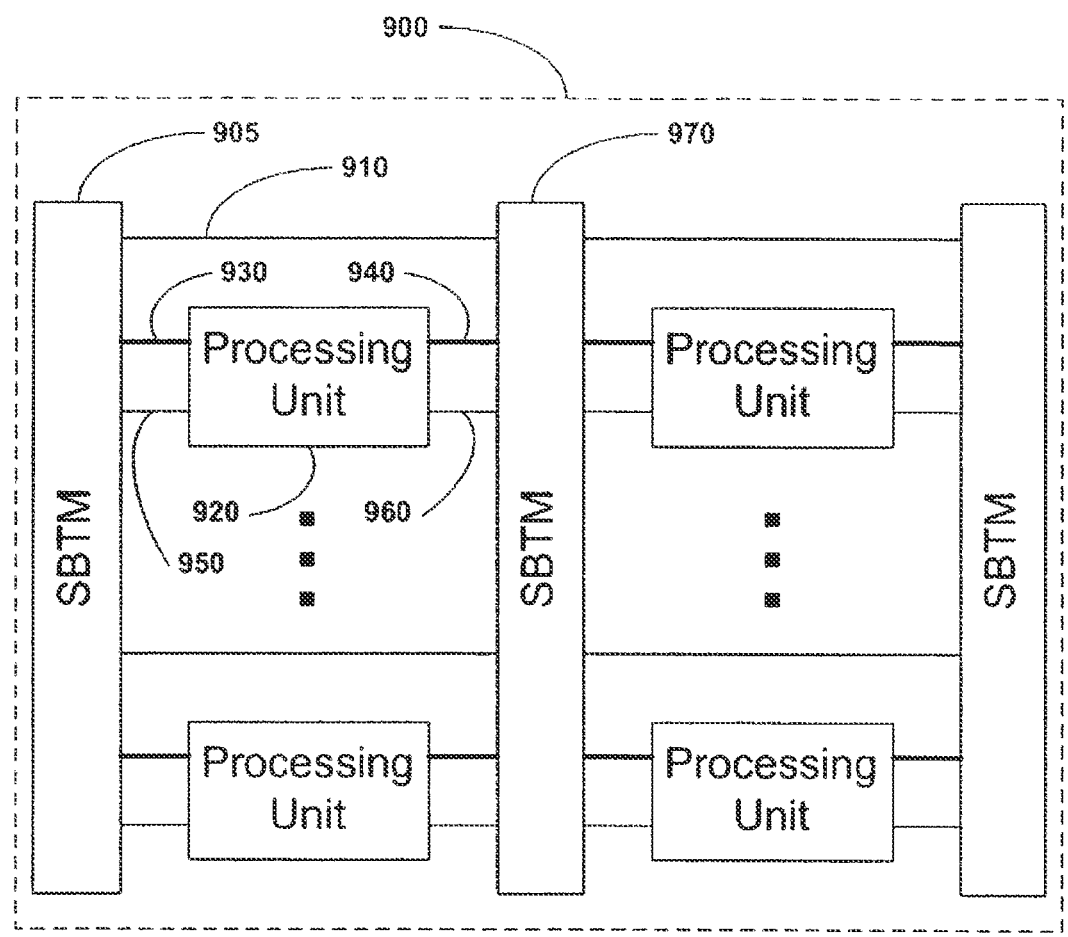
FIG. 9 shows a possible usage or application of an embodiment of the invention.

These SBTM 800 can be arranged with processing elements as shown in the exemplary pipeline segment Configuration 900 of FIG. 9.

In this pipeline segment configuration 900, at least one processing unit 920 may be coupled with at least two SBTMs 905 by SBTM data output 930, SBTM pointer output 950, SBTM data input 940, and SBTM pointer input 960. Each SBTM 905 may be further coupled with an upstream SBTM via free list connection 910.

As illustrated in exemplary drawing FIG. 9 the system may comprise multiple SBTMs, each copying into a Processing Unit 920, and following each into one such that the destination for one SBTM becomes the source for the next SBTM. In this configuration, with respect to a given Processing Unit 920, the SBTM for which the Processing Unit acts as a destination may be considered an upstream SBTM; the SBTM for which the Processing Unit acts as a source may be considered a downstream SBTM. In the specific example of FIG. 9, with respect to specific Processing Unit 920, SBTM 905 is the upstream SBTM, and SBTM 970 is the downstream SBTM for data flowing from left to right.

Comparing the structures illustrated in FIG. 8 and FIG. 9, SBTM data output 930 in FIG. 9 may correspond to SBTM data output 845 in FIG. 8; SBTM pointer output 950 corresponds to SBTM pointer output 815; SBTM data input 940 may correspond to SBTM data input 835; SBTM pointer input 960 may correspond to SBTM pointer input 810; and free list connection 910 may correspond to free list output 850 with respect to SBTM 970, and may correspond to free list input 825 with respect to SBTM 905.

Figure 10:
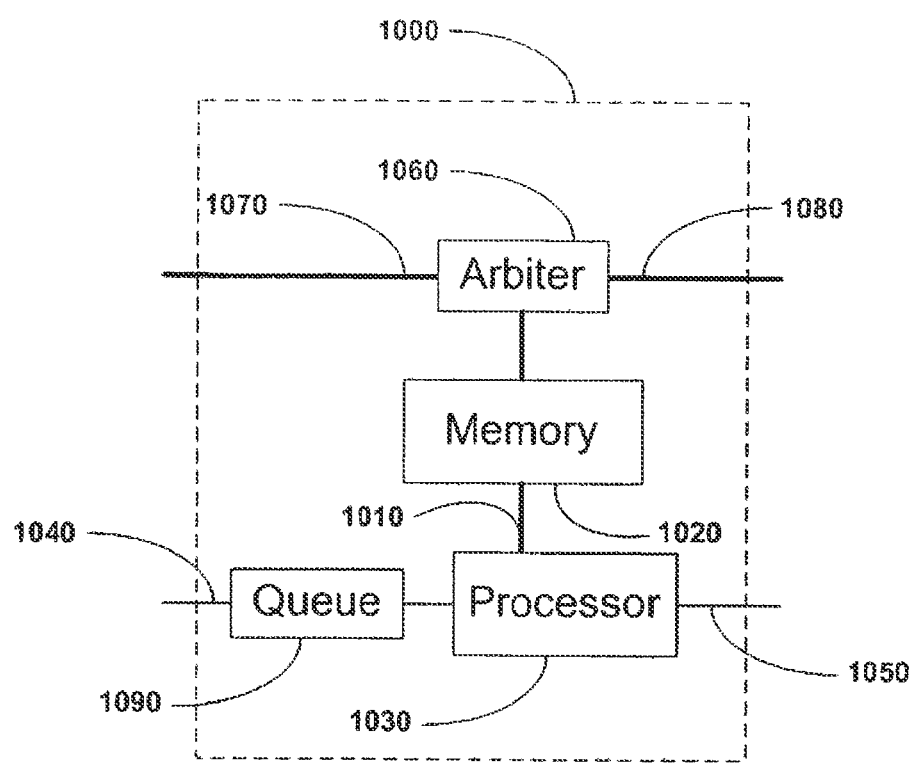
FIG. 10 shows an embodiment of a processing unit as depicted in FIG. 9.

Processing unit 920 is illustrated in exemplary embodiment of FIG. 10. In this illustration, processing unit 1000 includes a processor 1030 connected to a memory 1020 by a memory bus 1010 which may advantageously be a dedicated memory bus. The processor may also be connected to a queue 1090, wherein the queue input 1040 may correspond to SBTM pointer output 950 in the embodiment of FIG. 9. The output 1050 of processor 1030 may correspond to SBTM pointer input 960. In the configuration of FIG. 10, memory 1020 may advantageously be a dual-port memory; the second port may be connected to arbiter 1060. Arbiter 1060 provides access to memory 1020 for data busses 1070 and 1080. Arbiter 1060 may provide access to other busses as well, but those bus accesses (if any) are not critical to the invention. Memory bus 1070 corresponds to SBTM data output 930, and memory bus 1080 corresponds to SBTM data input 940. The various memory busses and the arbiter may use standard memory access techniques well-known to those skilled in the art or to be developed in the future, and are not critical to the invention, and are therefore not described in greater detail herein.

Figure 11:
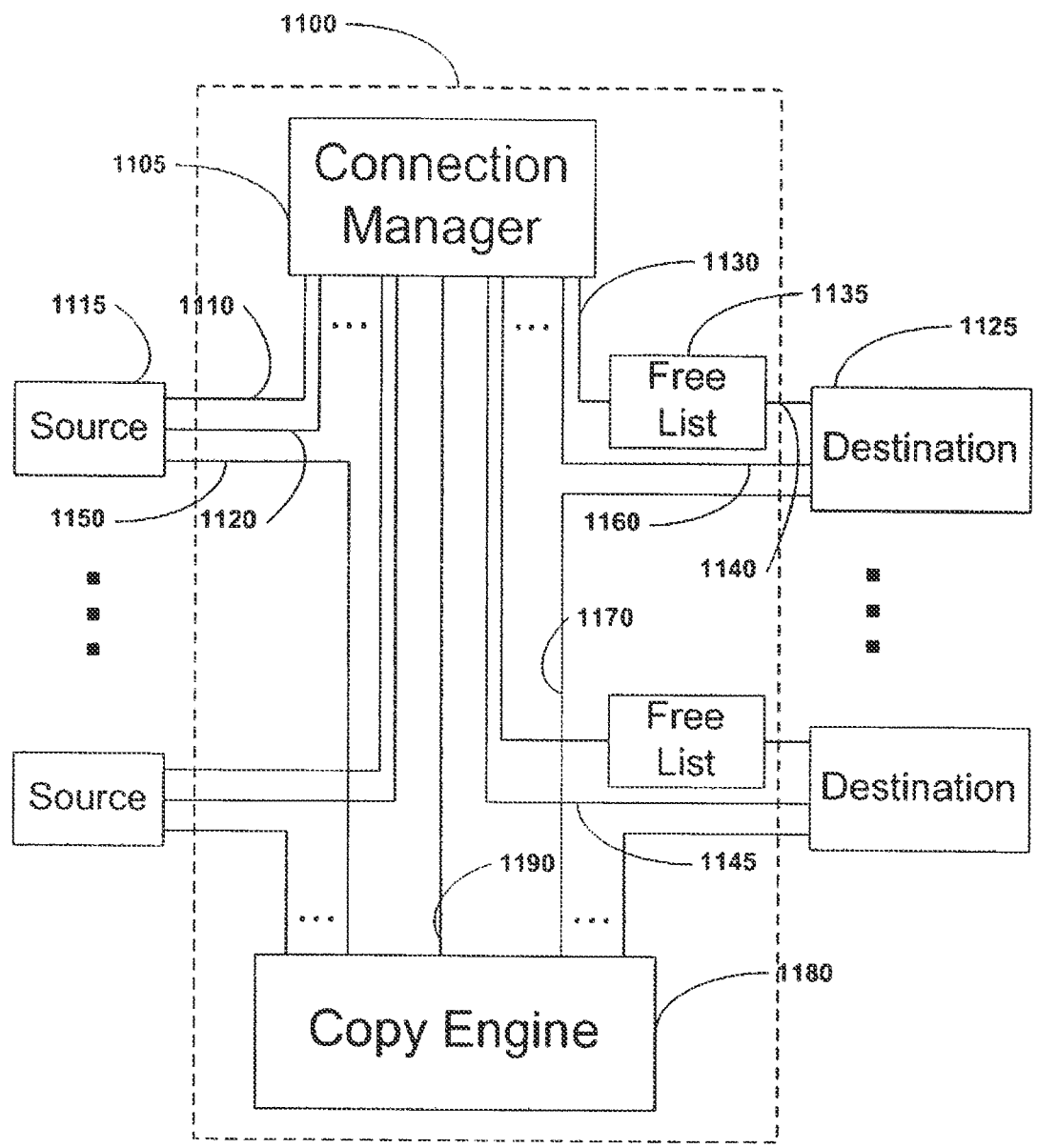
FIG. 11 shows another exemplary embodiment of the invention.

FIG. 11 is an illustration showing a non-limiting exemplary embodiment of one aspect of the invention, represented as configuration 1100. Data, such as memory data, may be transferred from one of several sources 1115 to one of several destinations 1125 via a connection established by Connection Manager 1105. The decision regarding which source and which destination to use for a particular connection may be made by Connection Manager 1105. Upon deciding on a connection—that is a source and a destination pair, Connection Manager 1105 instructs Copy Engine 1180 via connection 1190 to begin the copy operation between the selected source and destination. The instruction to the Copy Engine 1180 may be in the form of a signal value, command on a bus, or any other suitable mechanism or message. The memories from which data is copied and to which data is copied may be of varying or fixed size. The size of the memory is not critical to the invention. The location of the memories is also not critical to the invention. Some or all of the memories may reside in the same or different integrated circuits. In the one embodiment, Block Random Access Memory (BRAM) is used inside an FPGA, but external memories could have been used instead, and mixed configurations using internal and external memories may be implemented.

In the illustrated embodiment, Connection Manager 1105 has a plurality of pointer inputs 1120 and pointer output 1110 that are connected to a corresponding plurality of sources 1115. Connection Manager 1105 may also have a plurality of pointer outputs 1145 that connect to a corresponding plurality of destinations 1125. Connection Manager 1105 may also have a plurality of pointer inputs 1130 that connect to Free List 1135. Each Free List 1135 includes an input 1190 from a destination 1125. A control signal line or set of lines or interface 1140 may also be provided between the connection manager 1105 and the copy engine 1180 that provides a way for Connection Manager 1105 to control Copy Engine 1180. Copy Engine 1180 has a plurality of outputs 1170 to a corresponding plurality of Destinations 1125. The specific nature of connections 1110, 1120, 1130, 1140, 1150, 1160, and 1170 is not critical, and can be implemented in any number of ways well known to those skilled in the art. The number of Sources 1115 is at least one; the number of Destinations 1125 is at least one; and the number of Sources 1115 need not equal the number of Destinations 1125.

In the case where there is more than one Copy Engine 1180, the connections shown can be replicated for each Copy Engine 1180. Alternatively a Copy Engine 1180 could be associated with each Source 1115 with one set of dedicated connections between each Source 1115/Copy Engine 1180 pair. Alternatively a Copy Engine 1180 could be associated with each Destination 1125 with one set of dedicated connections between each Destination 1125/Copy Engine 1180 pair.

Free List 1135 can contain a list of destination memory blocks that are available to receive data. Input 1140 feeds Free List 1135 and can add pointers of available memory blocks to Free List 1135 as those blocks are freed up by a downstream SBTM. Pointer output 1110 can feed the Free List of an upstream SBTM. Input 1120 can provide the location of the block of data to be copied. Output 1160 provides a pointer to the block of data that has been copied to the destination. The specific implementation of Free List 1135 is not critical to the invention. In the preferred embodiment, it has been implemented using a queue, and specifically, a Fast Simplex Link (FSL), which is a means of implementing a queue known to users of certain Field Programmable Gate Arrays (FPGAs).

It may be appreciated that this connectivity permits the connection or coupling of any source 1115 with any destination 1125 under the control of Connection Manager 1105 and as a result of these connections, provides an ability to copy data or other content or information between any of the sources and destinations. Any processor may be a source or a destination for a given copy operation, depending upon how the system is configured. It should be appreciated that the number of Copy Engines 1180 need not be the same as either the number of Sources or the number of Destinations.

Figure 12:
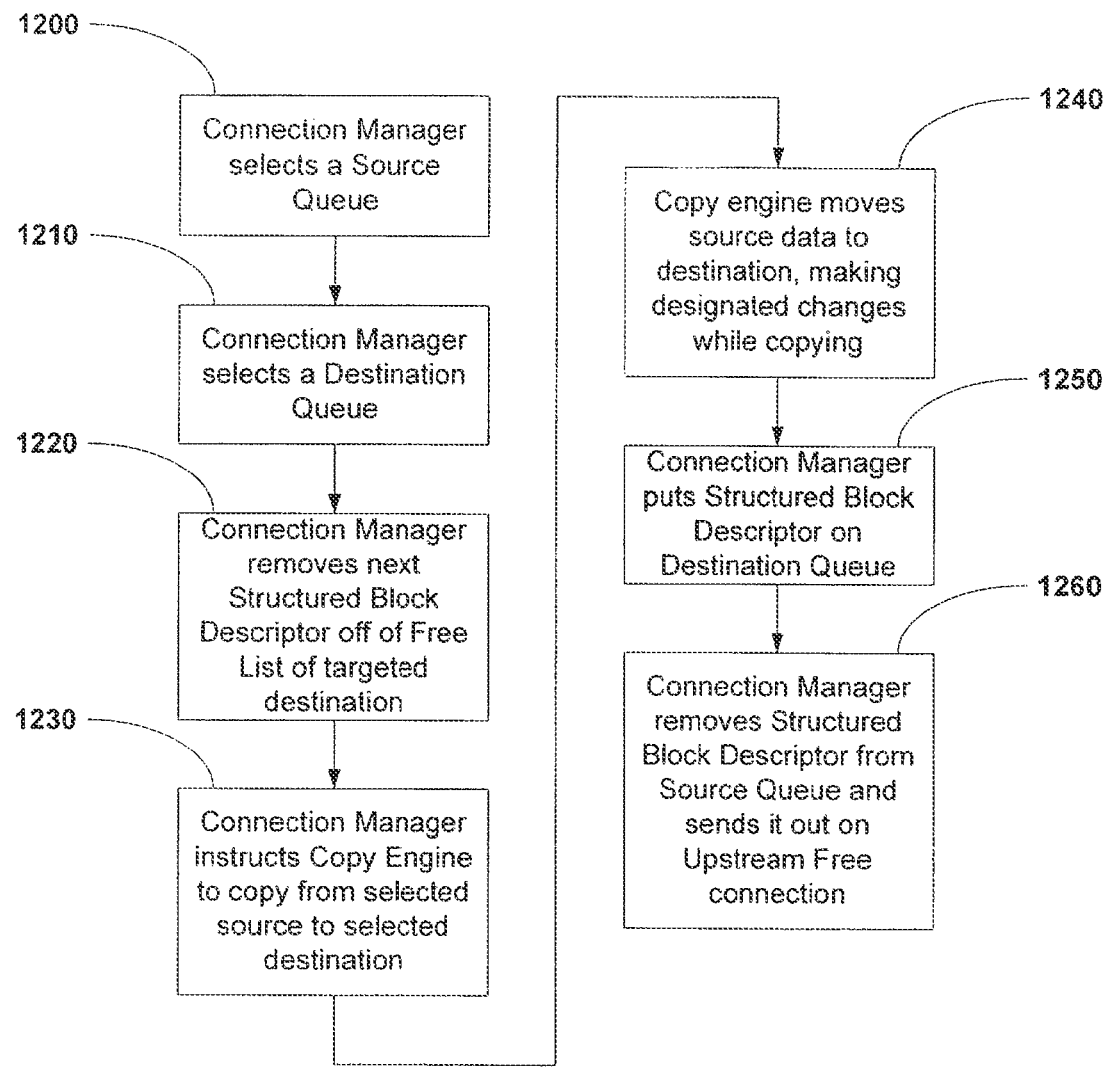
FIG. 12 is a diagrammatic flow-chart depicting a possible exemplary process for implementing a structured block copy using an embodiment of the invention.

FIG. 12 is a diagrammatic flow chart illustrating an embodiment for a procedure or process for transferring a structured block of data from a source to a destination. The process or procedure may advantageously use a Structured Block Descriptor or may use other descriptor. Although certain non-limiting embodiments of the invention may utilize particular structured block descriptors, the specific structure is not critical to the application. Advantageously, whatever structure is utilized, it will advantageously describe basic information about the block being copied and its location. In the preferred embodiment, it may include or consist simply of an address.

Connection Manager 1105 firsts selects (step 1200) a source 1115. It then selects (step 1210) a destination 1125. The order of selection is not important and may be reversed or the selections may be concurrent. Once the source and destination have been selected, the next Structured Block Descriptor on Free List 1135 corresponding to the selected destination is removed (step 1220) from its Free List 1135 and held by the Connection Manager 1105. Connection Manager 1105 then instructs (step 1230) Copy Engine 1180 to copy (step 1240) the contents from data input bus 1150 corresponding to the selected source to data output bus 1170 corresponding to the selected destination 1125. If multiple Copy Engines 1180 are used and there is not a direct correspondence between each Copy Engine 1180 and either a Source 1115 or Destination 1125, then in addition to selecting a Source 1115 and a Destination 1125, a Copy Engine 1180 must also be selected.

The means of copying, moving, duplicating, or shifting may be any of the means or methods known to one skilled in the art. One non-limiting but advantageous embodiment uses a Direct' Memory Access (DMA) copy means and method. During the copying process, selected portions of the data may optionally be altered en route so that the data at the destination may optionally be an altered version of the data from the source. Once the copying is complete, the Structured Block Descriptor that was previously removed (step 1220) from the Free List is sent (step 1250) to the selected destination 1125 on pointer output 1145. The Structured Block Descriptor at the selected source 1115 is taken from the source via pointer input 1120 and sent (step 1260) to output 1110 corresponding to the selected source 1115.

FIG. 12 describes an SBTM 905 that is taking data from an upstream source 1115 and transferring it to a downstream destination 1125. Step 1260 of that process includes the sending of a Structured Block Descriptor to the upstream Free List 1135. For the upstream SBTM 905, this makes available the memory block that was just emptied; by putting that block back on the Free List 1135, it can now be allocated to a new block by the upstream SBTM 905 (step 1220).

There are a variety of means which can be used to select a source 1115 and destination 1125. Among the possible means for selecting source and destination are included queue depth and memory availability, alone or combined with round-robin or other such arbitration schemes. An additional means is available for selecting the destination 1125, which is referred to as Direct Routing. In this Direct Routing case, the Structured Block Descriptor includes an index number or some other identifier specifying a destination 1125, and the Connection Manager 1105 ensures that the specified destination 1125 is selected.

Figure 13:
FIG. 13 illustrates an exemplary availability qualifier that may be used in an embodiment of the invention.

One non-limiting but preferred embodiment uses a non-obvious combination of queue depth and memory availability by creating a composite measure as shown in the embodiment of FIG. 13.

With reference to FIG. 13, a composite signal 1330 is created without serially making decisions regarding memory availability and then task queue depth. An availability signal (Available) 1300 and Queue Depth signal 1310 are provided to Availability Qualifier block 1320, which creates the Composite signal 1330 that includes signal contributions from the Availability and Queue Depth inputs. The particular means of qualifying the queue depth with availability can vary and are not critical to the invention. Two exemplary embodiments showing non-limiting alternative means are shown and described relative to the embodiments in FIG. 14 and FIG. 15.

Figure 14:
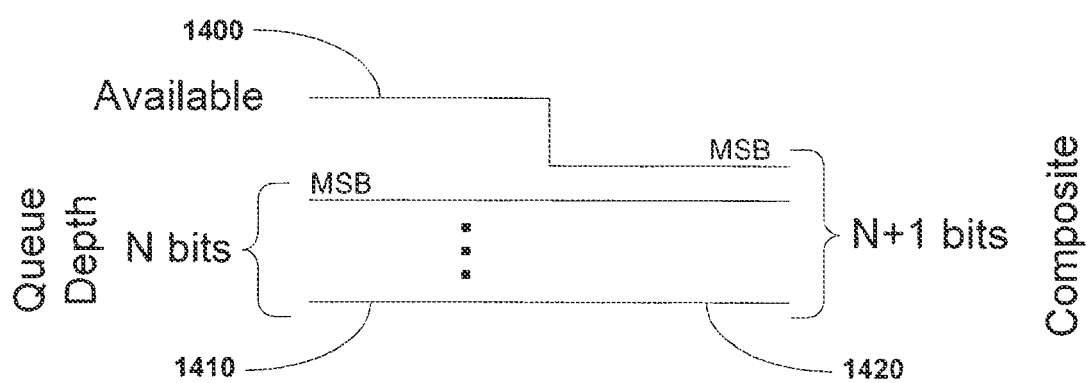
FIG. 14 shows one embodiment of the inventive availability qualifier of FIG. 13.

In the embodiment illustrated in FIG. 14 Queue Depth signal 1410 is an N-bit value. Availability signal 1400 is concatenated with the queue depth signal 1410 as the new Most Significant Bit (MSB) to provide Composite signal 1420 as an N+1-bit signal. If the Available signal 1400 is asserted as a logical "1" (or high signal), then the resulting N+1-bit Composite signal value will always be higher value than any Composite signal having the Available signal unasserted as a logical "0" (or low signal) since that bit is the MSB of the composite signal 1420. Given a plurality of Source queues utilizing this methodology, the selection will be made by selecting the Source queue with the highest value for the resulting n+1-bit number. If a particular implementation has an Available signal that asserts as a 0 instead of a 1, that signal would need to be inverted before being presented to the circuit of FIG. 14. Therefore, it will be appreciated that various different or opposite signaling logic schemes may be utilized without deviating from the invention.

Figure 15:
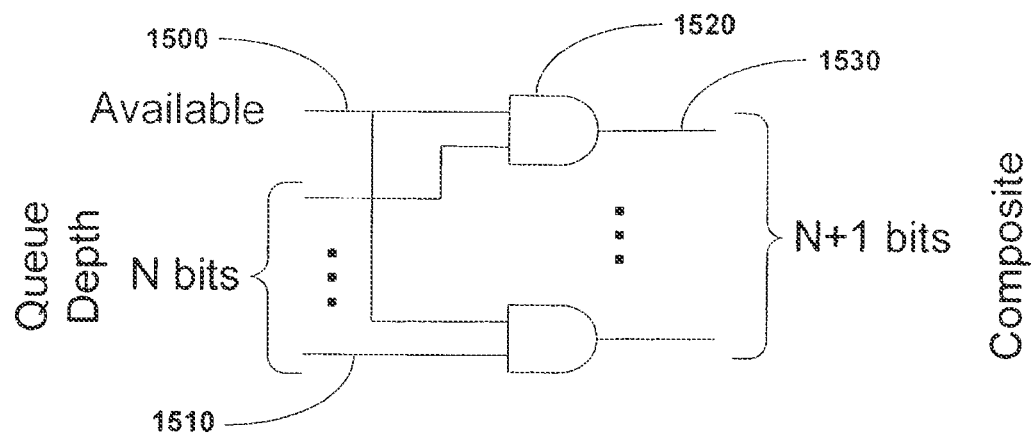
FIG. 15 shows another embodiment of the availability qualifier of FIG. 13.

FIG. 15 shows an alternative non-limiting embodiment of Availability Qualifier 1320 of FIG. 13. Here each bit of N-bit Queue Depth signal 1510 is logically ANDed with Available signal 1500 through a plurality of AND gates 1520. Alternative logic circuits that result in the logical ANDing operations or equivalent may be used. If the Available signal is asserted as a 1, then the resulting Composite signal 1530 will be equivalent in value to the original Queue Depth signal 1510. If the Available signal is unasserted as a 0, then the resulting value will be 0, which is guaranteed to be the lowest Composite value. Given a plurality of Source queues utilizing this methodology, in at least one non-limiting embodiment, the selection will be made by selecting the Source queue with the highest value for the resulting n+1-bit number. If a particular implementation has an Available signal that asserts as a logical 0 instead of a logical 1, that signal would need to be inverted before being presented to the circuit of FIG. 15. Again, in this alternative embodiment, it will be appreciated that various different or opposite signaling logic schemes may be utilized without deviating from the invention.

The preceding discussion allows the selection of the available queue with the greatest depth. This is appropriate when selecting an input from which to load-balance, since the goal is to unburden the fullest queue. However, when load balancing to an output, the intent is to pick the emptiest queue. Similar circuits can be used to achieve this, the difference being that the Availability signal is inverted in both circuits, and in the case of the latter circuit, the AND gates are replaced by OR gates. The selection process in either case is to select the queue with the lowest composite value. In these exemplary embodiments, it will be appreciated that various different or opposite signaling logic schemes may be utilized without deviating from the invention.

Figure 16:
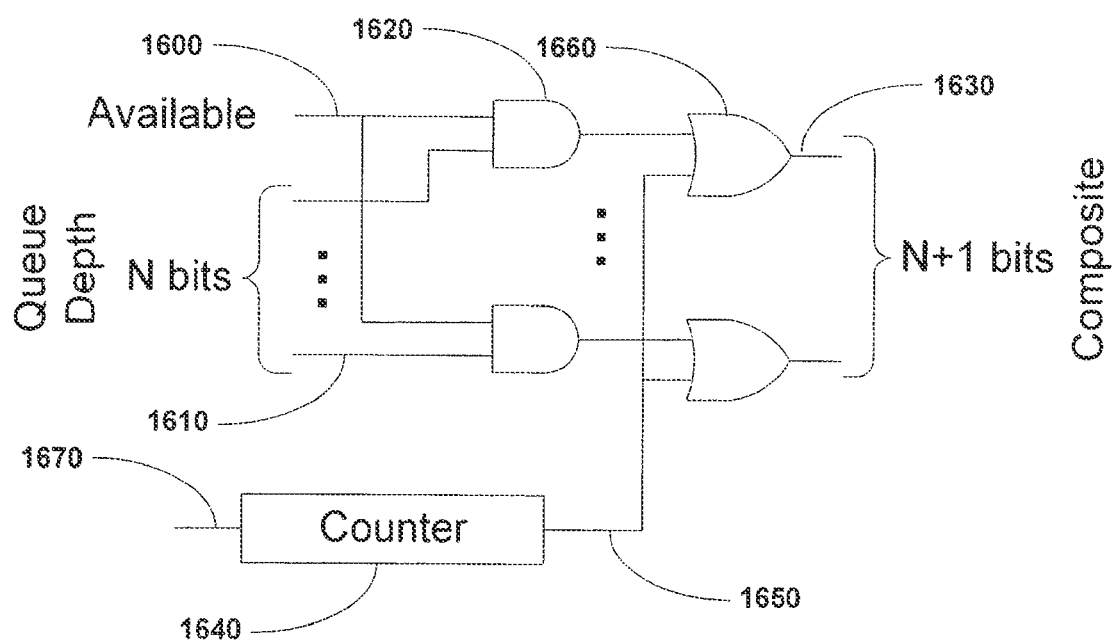
FIG. 16 shows an embodiment of the availability qualifier of FIG. 13 that ensures that no source queue goes for too long a period of time without being selected.

Yet another embodiment may alternatively be utilized and which can ensure that no Source Queue remains unselected for an extended period of time. FIG. 16 shows a non-limiting embodiment similar to that of FIG. 15, but which includes an additional Counter 1640. The counter has a pre-defined threshold, signal 1650 which is communicated to a plurality of logical OR gates (or equivalent logic). That threshold signal 1650 is then logically ORed with the qualified queue depth value 1610 using logic OR gates 1660 to generate a final Composite signal 1630. When the threshold is reached, signal 1650 will assert 1, and all bits of Composite signal 1630 will be 1, ensuring that this value will be the maximum value, prioritizing this signal for selection. Once selected, Counter 1640 is reset using signal 1670, and threshold signal 1650 will be deasserted. Given a plurality of Source queues utilizing this methodology, in at least one non-limiting embodiment, the selection will be made by selecting the Source queue with the highest value for the resulting n+1-bit number.

Figure 17:
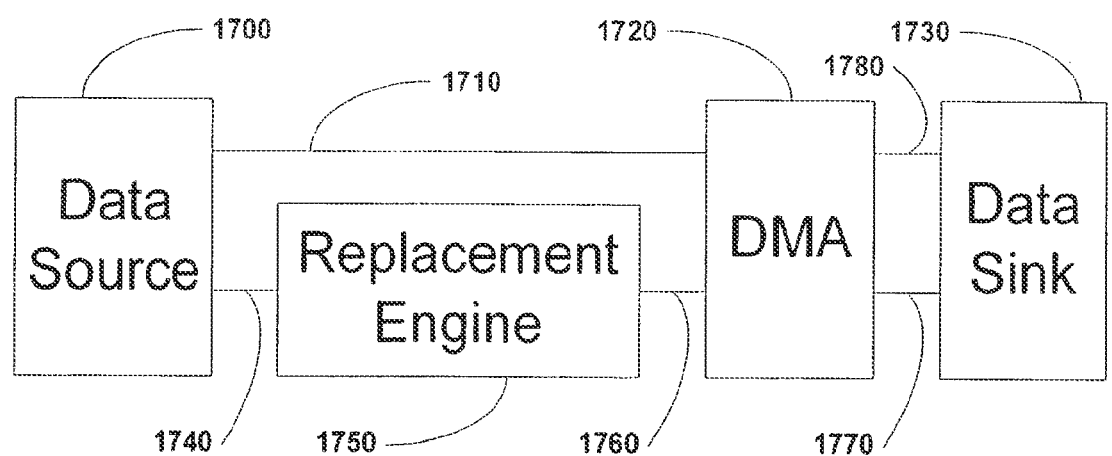
FIG. 17 shows one exemplary means and process of altering data during the copy process using a replacement engine.

Copied data may optionally be altered during the copying process or operation. There are a number of means by which the copied data can be altered or undergo additional processing during the copy process; the means by which this processing is accomplished or the processing performed is not critical to the invention. In one non-limiting embodiment, a Direct Memory Access (DMA) engine may be used to provide the desired copy operation. FIG. 17 shows one DMA engine based embodiment. DMA engine 1720 acquires data from Data Source 1700 using source address line 1710. Data line 1740 from Data Source 1700 may not go directly to DMA 1720, but may optionally go first through Replacement Engine 1750. Replacement engine 1750 is responsible for replacing portions of the data being copied with new data and may be implemented in any one or combination of ways. Altered data emerges from the replacement engine on data line 1760, and is placed into Data Sink 1730 by DMA 1720 using address line 1780 and data line 1770.

Figure 18:
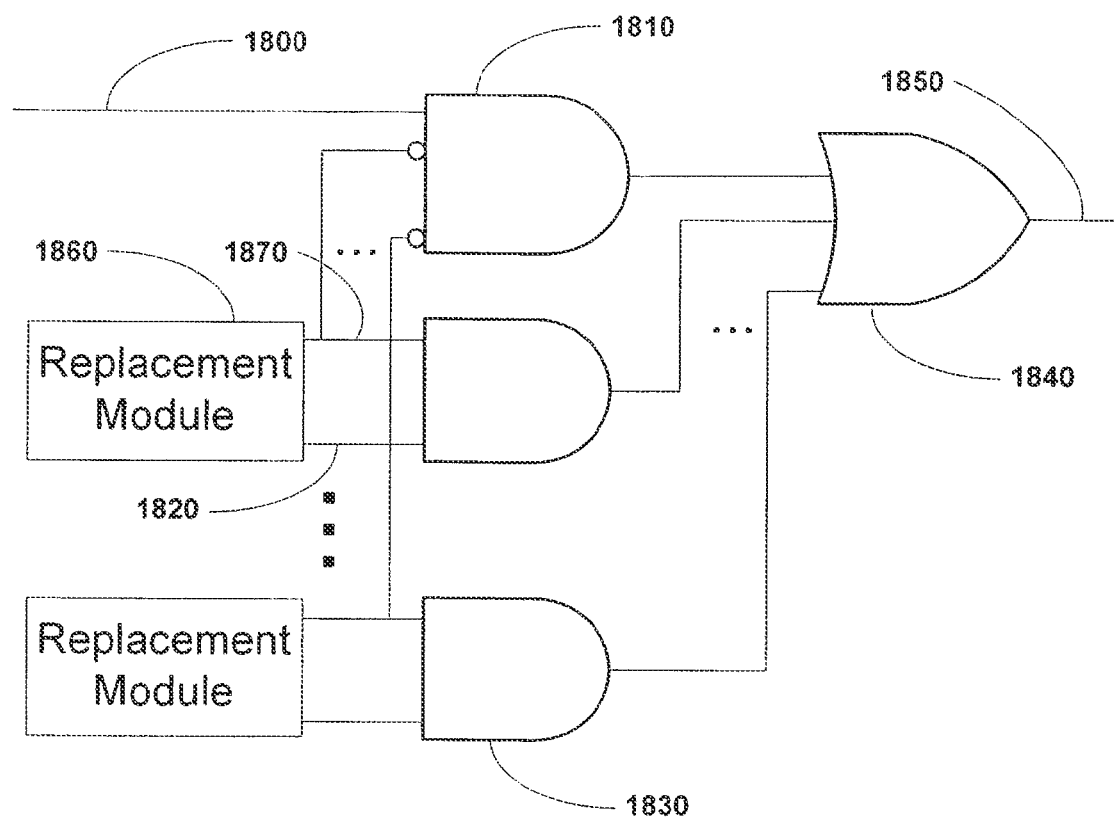
FIG. 18 shows one exemplary embodiment of the Replacement Engine illustrated in FIG. 17.

The specific workings of Replacement Engine 1750 may be implemented in a variety of ways and the specific way or means is not critical to the invention. FIG. 18 shows one non-limiting embodiment of Replacement Engine 1750. It includes a port or other means for receiving an original data signal 1800 and at least one and advantageously a plurality or a series of Replacement Modules 1860. The number of Replacement Modules can vary (for example, depending on the specific application or intended functionality) and is not critical to the invention. Typically, the number and character of the replacement modules are determined or selected on the basis of the number of blocks of data that need replacing, and the replacement data. The or each Replacement Module 1860 has two outputs, a Replace signal 1870 and a New Value signal 1820. The original data 1800 is logically ANDed with the inverse of all the Replace signals 1870 using AND gate 1810. The output of this AND gate will be deasserted 0 if any Replace signal 1870 is asserted 1. If no Replace signal 1870 is asserted 1, then the output of AND gate 1810 will be the same as original data 1800.

The two outputs 1870 and 1820 of each Replacement Module 1860 are logically ANDed together using AND gate 1830. If Replace signal 1870 for a given Replacement Module 1860 is deasserted 0, then the output of the corresponding AND gate 1830 will be deasserted 0. If the Replace signal 1870 for a given Replacement Module 1860 is asserted 1, then the output of the corresponding AND gate 1830 will be the same as the value of the corresponding New Data value 1820. If all of the Replacement Modules are designed with non-overlapping replacement criteria, then zero or one Replacement Module will have its Replace signal 1870 asserted 1. As a result, only one of the AND gates 1810 and 1830 will have a non-zero value. The outputs of all of the AND gates 1810 and 1830 are logically ORed together using OR gate 1840. If any Replace signal is asserted 1, then output 1850 will be the same as the New Data signal 1820 corresponding to the asserted Replace signal. If no Replace signal is asserted 1, then output 1850 will be the same as the original data.

It can be appreciated that the effect of this replacement is to modify select portions (or even all portions) of the data being copied in a manner specific to the intent of a particular use. Such replacement may or may not be required in a given use, but the capability constitutes an optional aspect of the invention. Other implementations can be used, with arbitration capabilities in the case of overlapping replacement criteria, using techniques known to one skilled in the art in light of the description provided here.

Figure 19:
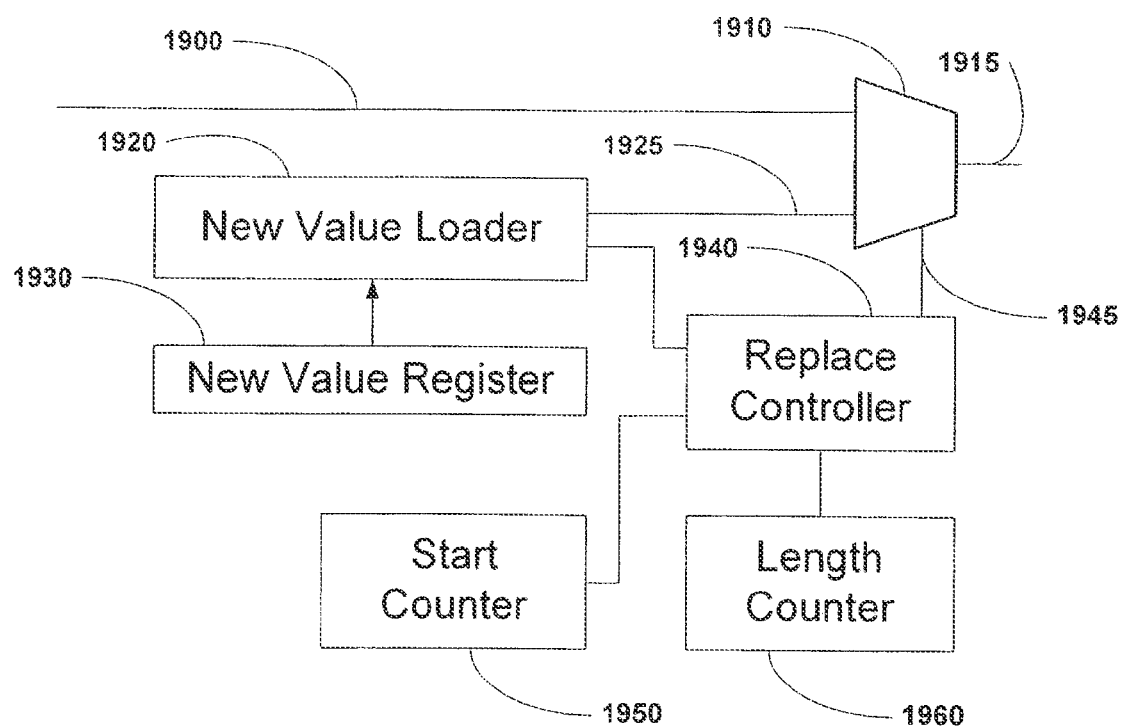
FIG. 19 shows one embodiment of the Replacement Module and replacement engine shown in FIG. 18.

A non-limiting embodiment of Replacement Module 1860 is illustrated in FIG. 19. Multiplexer 1910 selects between original data signal 1900 and a value from New Value Loader 1920. New Value Loader 1920 receives its value from New Value Register 1930. How New Value Register 1930 receives its value is not critical to the invention. It could be initialized upon system initialization, it could have a permanent hard value assigned, or some other means of loading the value could be used. Likewise, Start Counter 1950 and Length Counter 1960 have a threshold values that could be initialized, be hard-wired, or be assigned by some other means.

Figure 20:
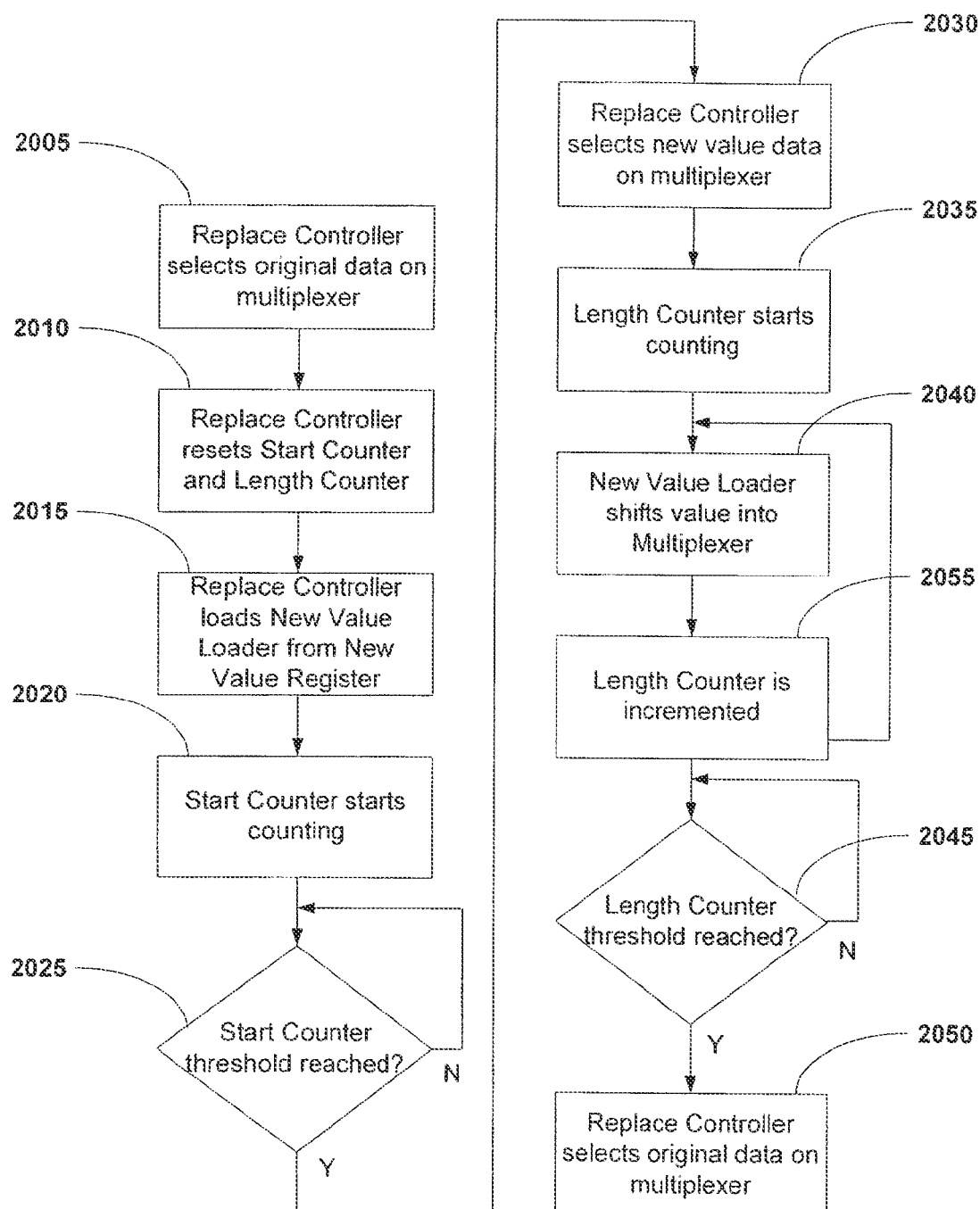
FIG. 20 shows a possible process for implementing replacement using the Replacement Module embodiment illustrated in FIG. 19.

The functioning of the example Replacement Module circuit in FIG. 19 is illustrated in the embodiment of FIG. 20. Replace Controller 1940 sets (step 2005) the selector 1945 for Multiplexer 1910 such that the original unaltered data on signal 1900 passes through to output 1915. Both counters 1950 and 1960 are reset (step 2010). New Value Loader 1920 is loaded (step 2015) from New Value Register 1930. The order in which Steps 2010 and 2015 occur is not important; they could also be executed simultaneously. Start Counter 1950 is started (step 2020). When the threshold is reached (step 2025), Replace Controller 1940 changes (step 2030) the selector 1945 value for Multiplexer 1910 to pass data from New Value Loader 1920 on signal 1925 out onto output 1915. Length Counter 1960 starts counting (step 2035), and at each cycle New Value Loader shifts (Step 2040) the next piece of data into Multiplexer 1910. Note that this could be single-bit data, byte data, or any other data quantum. The number of bits transferred at once is not critical to the invention. Length Counter 1960 is incremented (Step 2055), and once the threshold for Length Counter 1960 is reached (Step 2045), Replace Controller 1940 sets (step 2050) the selector 1945 value for Multiplexer 1910 to pass the original unaltered data from signal 1900. The format of signals 1900, 1915, and 1925 could be any format suitable for passing the format of data chosen, including busses of different widths. The format of these signals is not critical to the invention.

FIG. 17, FIG. 18, FIG. 19, and FIG. 20 illustrate non-limiting but exemplary logic and circuit means of replacing data. Other suitable means as may be known in the art may alternatively also be used in conjunction with the invention. Other types of data replacement can be used as well. The above structure and method rely on replacing data at a fixed point in a data stream. Alternatively, pattern-matching techniques may be used to identify strings of data and replace them with other strings of data. The specific means or procedures of determining which data to replace and of deciding which data to use as replacement are not critical to the invention and may be dependent on factors such as specific circuit application, desired complexity and cost of the implementation, or other factors alone or in combination.

ADDITIONAL DESCRIPTION

As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

What is claimed is:

1. A system for copying data, the system comprising:
    a source processing unit comprising a source processor and a source memory configured to store a plurality of blocks of data, the source memory being a private memory of the source processor;
    a first destination processing unit comprising a first destination processor and a first destination memory that is a private memory of the first destination processor;
    a structured block transfer module (SBTM) comprising:
        a connection manager coupled to the source processing unit and the first destination processing unit, the connection manager configured to:
            receive a request to copy a block of data of the plurality of blocks of data, the block of data stored at a source memory location of the source memory,
            obtain the source memory location of the block of data, and
            select a destination memory location of the first destination memory available to store the block of data; and
        a first copy engine configured to copy the block of data from the source memory location to the destination memory location in response to receiving a signal from the connection manager; and
        a replacement engine coupled to the first copy engine and at least one of the source processing unit and the first destination processing unit, the replacement engine configured to modify at least a portion of the copied data block, the replacement engine comprising:
            a value loader outputting a replacement data signal,
            a replace controller outputting a replace signal in response to a start counter greater than or equal to a threshold and a length counter less than a threshold, and
            a multiplexing unit configured to replace data from the source processing unit with data from the replacement data signal in response to the replace signal.

2. The system of claim 1, further comprising:
    at least one second destination processing unit coupled to the SBTM, each of the at least one second destination processing unit comprising a second destination processor and a second destination memory.

3. The system of claim 2, wherein the request to copy indicates the destination memory location, and wherein the connection manager is further configured to select the first destination processing unit from the first destination processing unit and the at least one second destination processing unit.

4. The system of claim 2, wherein the connection manager is configured to select the first destination memory from destination memories of the first destination processing unit and the at least one second destination processing unit based on (i) load at the first destination processing unit and the at least one second destination processing unit and (ii) availability of memory space of the destination memories of the first destination processing unit and the at least one second destination processing unit for storing the block of data.

5. The system of claim 2, further comprising:
    a plurality of destination queues, each of the destination queues associated with one of the destination memories of the first destination processing unit and the at least one second destination processing unit, the destination queue storing a plurality of descriptors indicating memory locations of blocks of data in the destination memories of the first destination processing unit and the at least one second destination processing units, the connection manager configured to select the first destination memory based on numbers of descriptors in the source queues.

6. The system of claim 1, wherein the connection manager is further configured to select the source processing unit from a plurality of source processing units.

7. The system of claim 6, wherein the request to copy indicates the source memory location, and wherein the connection manager is configured to obtain the source memory location from the request to copy.

8. The system of claim 6, wherein the connection manager is further configured to select the source processing unit based on numbers of requests associated with the plurality of source processing units.

9. The system of claim 6, further comprising a plurality of source queues, each source queue associated with one of the plurality of source processing units, the source queue storing a plurality of descriptors indicating memory locations of blocks of data in source memories of the source processing units, the connection manager further configured to select the source processing unit based on numbers of descriptors in the source queues.

10. The system of claim 1, wherein the SBTM further comprises at least one second copy engine to simultaneously copy at least an additional block of data, wherein the connection manager is configured to select the first copy engine from the first copy engine and the at least one second copy engine to copy the block of data.

11. The system of claim 1, further comprising:
a first destination location memory unit indicating memory locations in the first destination memory available for storing blocks of data.

12. The system of claim 11, wherein the connection manager is further configured to update availability of the destination memory location in the first destination location memory unit in response to copying the block of data from the source processing unit to the first destination processing unit.

13. The system of claim 11, further comprising:
at least a second destination location memory unit corresponding to at least a second destination processing unit, the connection manager configured to select the first destination memory unit from the first destination memory unit and the at least one second destination memory unit based on availability of the first destination memory received from the first destination location memory unit and based on availability of the at least one second memory unit received from the at least one second destination location memory unit.

14. The system of claim 1, further comprising:
a source location memory unit indicating memory locations in the source memory available for storing blocks of data, the connection manager further configured to update availability of the source memory location in response to copying the block of data from the source processing unit to the first destination processing unit.

15. The system of claim 14, further comprising:
a plurality of source location memory units corresponding to a plurality of source processing units, the connection manager further configured to select the source processing unit from the plurality of source processing units based on unavailability of the source memories received from the plurality of source location memory units.

16. The system of claim 1, wherein the replacement engine comprises:
a replacement module providing a replacement data signal and a replace signal, the replacement engine configured to replace data from the source processing unit with the replacement data signal in response to the replace signal.

17. The system of claim 1, wherein the source memory is connected to the source processor by a dedicated bus, and the first destination memory is connected to the first destination processor by another dedicated bus.

18. A non-transitory, computer-readable medium storing instructions executable by one or more processors, the instructions representing a system comprising:
a source processing unit comprising a source memory storing a plurality of blocks of data, the source memory a private memory of a source processor;
a destination processing unit comprising a destination memory, the destination memory a private memory of a destination processor;
a structured block transfer module (SBTM) comprising:
a connection manager coupled to the source processing unit and the destination processing unit, the connection manager configured to:
receive a request to copy a block of data of the plurality of blocks of data, the block of data at a source memory location of the source memory,
select an available destination memory location of the destination memory, and
store an updated availability of the source memory location in response to copying the data block from the source processing unit to the destination processing unit; and
a copy engine to copy the block of data from the source processing unit to the destination processing unit in response to a signal from the connection manager;
a replacement engine coupled to the first copy engine and at least one of the source processing unit and the first destination processing unit, the replacement engine configured to modify at least a portion of the copied data block, the replacement engine comprising:
a value loader outputting a replacement data signal,
a replace controller outputting a replace signal in response to a start counter greater than or equal to a threshold and a length counter less than a threshold, and
a multiplexing unit configured to replace data from the source processing unit with data from the replacement data signal in response to the replace signal.

* * * * *